United States Patent [19]

Pounds

[11] 4,042,439

[45] Aug. 16, 1977

[54] METHOD OF MAKING KEYBOARD ASSEMBLIES

[75] Inventor: Walter R. Pounds, Lafayette, Colo.

[73] Assignee: KB-Denver, Inc., Loveland, Colo.

[21] Appl. No.: 662,037

[22] Filed: Feb. 27, 1976

Related U.S. Application Data

[62] Division of Ser. No. 576,694, May 12, 1975, Pat. No. 3,967,084.

[51] Int. Cl.[2] .......................... B29H 7/04; B32B 31/00

[52] U.S. Cl. .................................... 156/292; 156/293; 156/298; 197/98; 200/5 A; 200/278; 235/145 R; 340/365 R; 428/67; 428/161; 428/138

[58] Field of Search ............... 156/182, 299, 230, 300, 156/235, 309, 241, 560, 249, 561, 288, 566, 282, 563, 293, 564, 297, 565, 298, 570, 265, 573, 212, 214; 428/67, 196, 161, 138, 201; 29/626, 627; 197/98; 235/145 R; 340/365 R; 200/5 A, 5 B, 5 E, 159 B, 278, 275, 292; 264/153, 273, 259, 278, 272

[56] References Cited

U.S. PATENT DOCUMENTS

| | | | |
|---|---|---|---|
| 1,946,878 | 2/1934 | Pazziani et al. | 156/299 |
| 2,521,827 | 9/1950 | Carter | 156/572 |
| 3,290,439 | 12/1966 | Willcox et al. | 197/98 |
| 3,643,041 | 2/1972 | Jackson | 200/5 A |
| 3,658,618 | 4/1972 | Gramann | 156/235 |
| 3,952,174 | 4/1976 | Boulanger et al. | 200/5 A |

*Primary Examiner*—Charles E. Van Horn
*Assistant Examiner*—J. J. Gallagher
*Attorney, Agent, or Firm*—Hugh H. Drake

[57] ABSTRACT

A keyboard assembly includes an insulative substrate upon which are carried a plurality of conductive paths. Respective portions of the paths are selectively bridged upon depression of a dome-shaped conductive resilient contact element. A pair of space-opposed regions of the dome's marginal portion are deformed downwardly away from its apex so as to constitute a pair of space-opposed feet. The feet have a complex shape which leads to high lifetime of the dome. Preferably, the feet rest on corresponding conductive pads, and the pad pairs for adjacent domes may be differently oriented so as better to accommodate the passage of leads between those domes. Leads on the substrate passing beneath dome edges desirably are depressed into the substrate. Overlying the domes in a completed assembly is a layer of deflectable insulating material that is adhesively affixed to the substrate and to the domes; the latter includes an aperture in registry with each dome but of a diameter smaller than the width of such dome. Advantageously, the adhesively-coated layer also is utilized for the purpose of picking up individual domes from a magazine and transferring them to their assigned positions on the substrate.

8 Claims, 17 Drawing Figures

METHOD OF MAKING KEYBOARD ASSEMBLIES

RELATED APPLICATIONS

This is a division of co-pending parent application Ser. No. 576,694, filed May 12, 1975, now U.S. Pat. 3,967,084, and assigned to the same assignee as the present application.

The present invention pertains to methods of making keyboard assemblies. More particularly, it relates to methods of making a keyboard substrate that carries resilient domes each of which may be depressed to close a circuit.

Developments in solid-state electronics have led to great reduction in the size of instruments such as calculators and related computational apparatus. In the kind of unit which employs a keyboard to permit input by means of fingertip pushbutton depression, the keyboard assembly has tended to pose at least as much of a limitation upon size reduction of the overall unit as the electronic components which perform the interrelated operations. In furtherance of miniaturization of the keyboard assembly, one general approach implemented by several different manufacturers has involved the use of an electrical switch element in the form of a resilient metal dome. The marginal edge of the dome is in electrical contact with a first terminal carried by an insulating substrate, while the center of the dome overlies another terminal also carried by the substrate. Upon depression of the central region of the dome into contact with one terminal, a connection is completed between the two terminals.

In its simplest form, such a dome is a smooth sector of a sphere. One drawback in the use of a simple sphere segment has been its lack of sufficiently effective tactile feedback. That is, the user finds it difficult to detect through the sense of feel in his fingertip just when actual electrical contact has been made upon depression of the pushbutton which flexes the dome. Thus, it becomes desirable that the dome exhibits what at least feels like a snap action. To this end, domes have been developed which include some sort of polygonal, usually triangular, shaping. In some cases, the marginal edge portions of the domes have been cut so as to define a polygonal shape. In another case, the marginal edge of the dome has been retained in circular shape but the body of the dome has been embossed in a pattern which has a generally triangular shape. In all of these cases, the dome has been further embossed or deformed at each of the corners of the polygon so as to form a foot which rests upon a corresponding electrical terminal carried by the insulating substrate. A leading difficulty with these approaches has been a decided tendency for metallic fractures to develop at the edges of the feet, leading to failure of performance of the dome prior to failure of any other component of the associated instrument.

In prior keyboard assemblies, it often has been customary to confine the domes in place by the use of apertured insulating layers which cooperate with overlying sheets and serve to define what have been called "cages". In seeking to overcome the additional expense of the formation of such cages, one manufacturer has come forth with an approach of thermally bonding a single layer both to the domes and to adjacent portions of the substrate. Unfortunately, this technique becomes a step backwards in that it substantially reduces the degree of presence of the aforementioned tactile feedback.

In general, prior substrates have employed one of two different approaches for carrying the necessary conductive leads which are plated or otherwise printed thereon. In one type, all of the conductors which lead into contact with the peripheral edges of the different domes are disposed on one side of the substrate. The other conductors, which must lead to areas beneath the central regions of the dome, are diposed upon the opposite substrate surface and extend through apertures in the substrate located beneath the different dome central regions. In some cases, staplelike elements have been employed to complete electrical conductivity between leads disposed on one side of the substrate and portions of the domes affixed to the opposite side of the substrate. In attempting to avoid the use of conductive paths extending through the substrate, one prior technique has been to dispose different conductive elements at different elevations above the basic substrate on the same side thereof as the domes. In accordance with another technique, all conductive paths are disposed in co-planar relationship on the same side of the substrate as supports the domes. An additional insulating layer is disposed on top of all but the terminal portions of such leads in order to avoid contact with other than the desired portions of the domes. In seeking to maintain miniaturization of the overall keyboard assembly, arrangements are known in which various leads are routed so as to extend beneath one or more domes other than the one or ones to which such leads are to be connected. All of these prior approaches have led to an undesired degree of manufacturing complexity. In turn, of course, that has resulted in increased manufacturing costs.

A typical keyboard assembly may have between ten and thirty switch element positions. The keyboard substrate may have a dimension of the order of two by three inches. Consequently, each dome necessarily must have a transverse dimension of no more than the order of 0.3 inch. For assembly of such small parts in such a confined assembly, manufacturing personnel have had to develop a high degree of dexterity with their fingers, together with a fine sense of touch, for insuring satisfactory mounting of the domes and related assemblies upon the basic substrate. Being all alike, the domes often tend to cling to one another when combined in a bin or other source of supply. That can lead to difficulty in making sure, during assembly, that only one dome is disposed at each site on the substrate. In consequence, the cost of manufacture of the completed keyboard assemblies has been higher than desired.

It is, accordingly, a general object of the present invention to provide a new and improved approach to the making of a keyboard assembly which helps to overcome the many different disadvantages and inefficiencies attendant to prior keyboard assemblies such as those hereinabove discussed.

A primary object of the present invention is to provide a new and improved method of fabricating keyboard assemblies.

A related object of the present invention is to provide a new and improved keyboard assembly which facilitates and utilizes a method of formation that results in increased reliability and efficiency of The invention thus relates to the assembly of a plurality of at least generally dome-shaped resilient contact elements in a predetermined pattern to overlie a related pattern of spaced-conductor regions, so that the elements may be centrally depressed to bridge spaced conductive portions. In accordance with the invention, a plurality of the elements are stocked in each of a plurality of stacks and in a layout corresponding to the resultant predetermined pattern. A layer of flexible insulating material is positioned over the stacks of the elements, that layer being adhesively coated on its undersurface. The layer is pressed against the uppermost one of the elements in each of the stacks. Upon subsequent removal of the layer, with the uppermost ones of the elements thereto adhesively affixed, the layer is caused to assume a position overlying the regions with the affixed ones of the elements in registry with the related pattern of the regions. Finally, the layer is pressed toward the regions while maintaining such registry.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
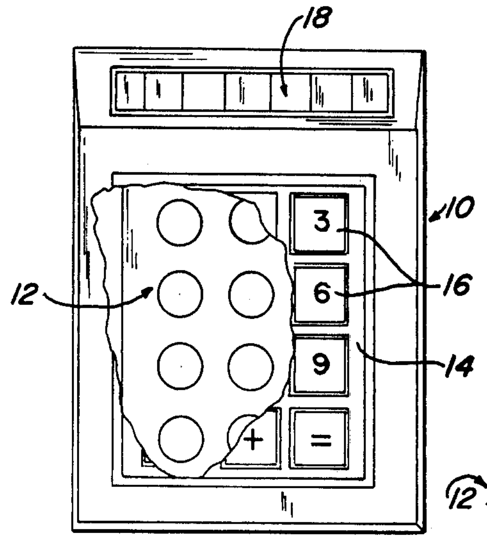
FIG. 1 is a plan view, partially broken away, of a calculator that uses a keyboard assembly of the present invention.

An electronic calculator includes a housing 10 which encloses integrated computational circuitry and devices (not shown) and a keyboard assembly 12. An apertured cover plate 14 positions and captivates a plurality of pushbuttons 16 that individually are marked to indicate respective different functions or parameters. An indicator lamp bank 18 provides visual read-out of the results calculated.

Figure 2:
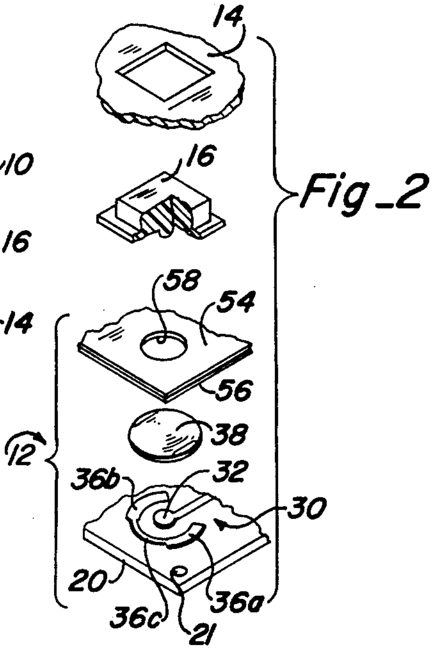
FIG. 2 is an exploded perspective view of a fragmentary portion of apparatus included in FIG. 1.
Figure 8:
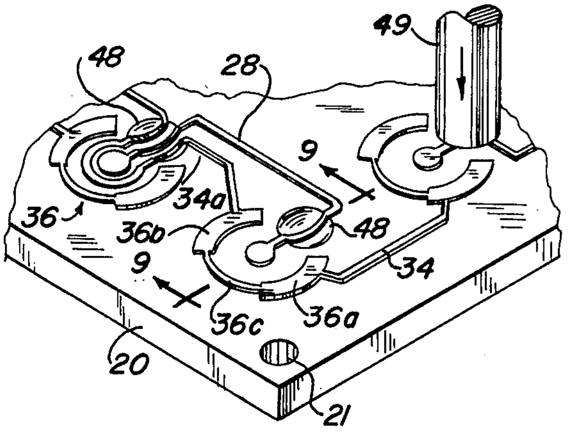
FIG. 8 is a fragmentary perspective view of another component of the assembly of FIGS. 1 and 2, together with a tool used during one step in the manufacture of that component.
Figure 9:
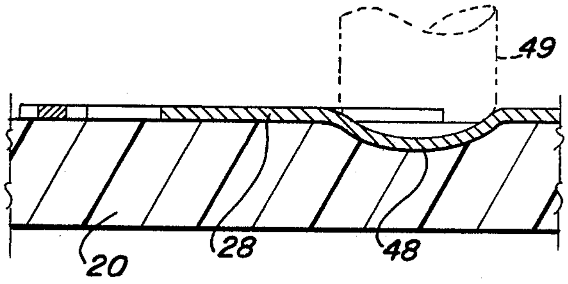
FIG. 9 is a cross-sectional view taken along the line 9—9 in FIG. 8, together with a phantom representation of one position of the tool mentioned in connection with FIG. 8.
Figure 10:
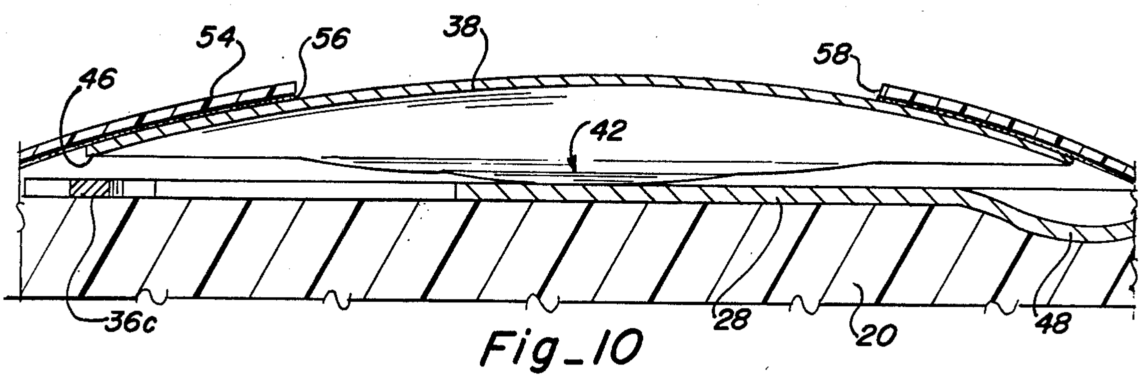
FIG. 10 is a fragmentary cross-sectional view of certain components show in FIG. 2 when assembled.
Figure 11:
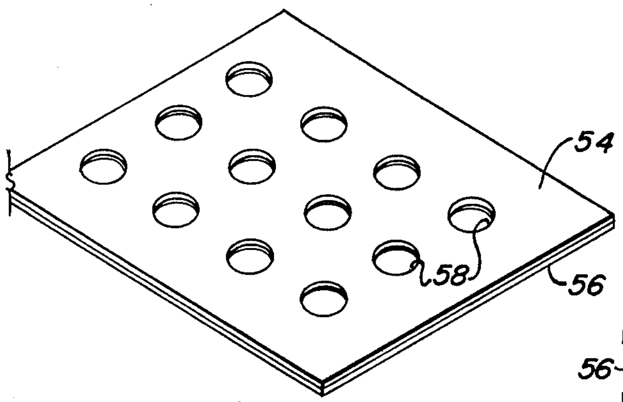
FIG. 11 is a perspective view of a specific component of the assembly of FIGS. 1 and 2.
Figure 16:
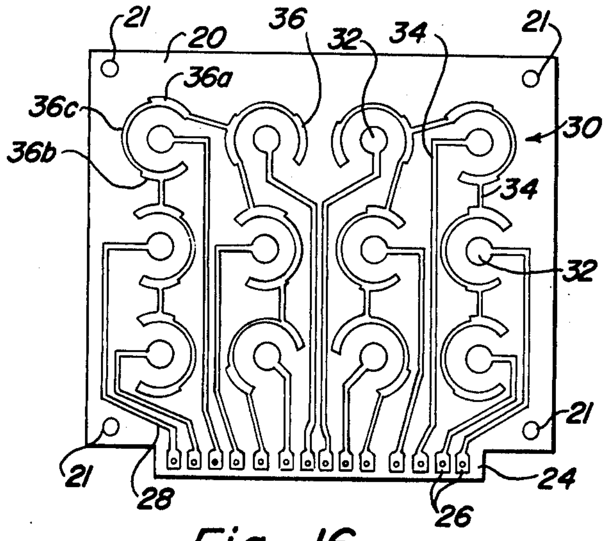
FIG. 16 is a plan view of a completely laid-out version of one of the components of the assembly of FIGS. 1 and 2.
Figure 17:
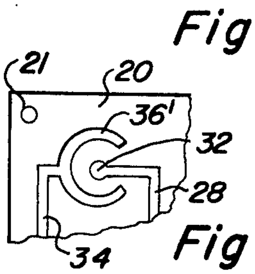
FIG. 17 is a fragmentary plan view of the component of FIG. 16 but with an alternative formation of one element.

For supporting the different electrical elements associated with keyboard assembly 12, a substrate 20 is of generally rectangular configuration. In itself, substrate 20 is formed of a laminate of insulating material. At each corner of substrate 20 is a hole 21 which accommodates assembly of the substrate into the calculator or other instrument. Projecting from one margin of substrate 20 is a lip 24 (FIG. 16) upon which is plated or otherwise deposited a succession of conductive connecting pads 26. In a well known manner, pads 26 are intended, in the overall instrument assembly, to mate with a like plurality of electrical contacts which lead to associated electronic circuitry. Extending from a first plurality of pads 26 are a group of electrically-conductive leads 28 that terminate at individually different respective switch sites 30 and corresponding inner terminals or lands 32. A second group of leads 34 individually connect the respective different outer terminals or lands 36 respectively at each of the different ones of sites 30. As shown in the drawing, many of outer terminals 36 in this example are connected in common with each other. As shown in FIGS. 2, 8 and 16, each outer terminal portion is made up of diametrically-opposed arcuate segments **36*a* and 36*b* interconnected by an arcuate conductive line 36*c*. In the alternative form shown in FIG. 17, each of outer terminal portions 36' is in the form of an approximate 270° portion of an annulus which surrounds the inner terminal 32. In either case, terminals 32 are each in the form of a small disc, with its connecting lead extending outwardly through the discontinuity in the corresponding one of outer terminals 36 or 36'**.

Covering each switch site 30 is a dome-shaped resilient element 38. Deformed downwardly away from the apex 40 of element 38 are a pair of space opposed feet 42 located in corresponding space-opposed regions of the marginal portion of the element. When assembled, each dome 38 is disposed adjacent to substrate 20 so that its feet 42 are in physical and electrical contact with an outer terminal portion 36. Thus, the central region of the dome, including its apex 40, is in registry over a terminal portion 32 so as to enable connection between that central region and portion 32 upon depression of the central dome region.

Figure 5:
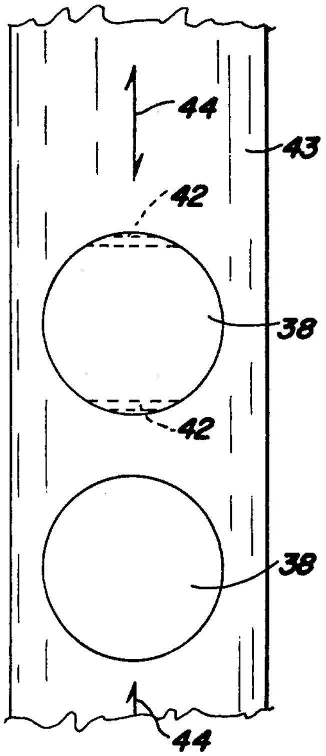
FIG. 5 is fragmentary plan view illustrating the manufacture of the component shown in FIG. 4.
Figure 6:
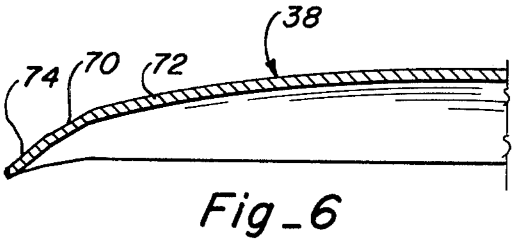
FIG. 6 is a fragmentary cross-sectional view taken along the line 6—6 in FIG. 4.

Domes 38 are punched out of a sheet 43 of stainless steel. In the process of milling such a sheet through rollers, it acquires a physical property known as grain. The orientation of that grain is indicated in FIG. 5 by means of lines 44. When formed, space-opposed feet 42 are disposed so as to lie predominately across grain lines 44. That is, an imaginary line connecting the two associated ones of feet 42 would lie parallel to grain lines 44. This contributes significantly to the flexure life of the individual different ones of domes 38.

Feet 42 depend downwardly sufficiently that the side margins 46 of each dome 38, intermediate feet 42, are spaced above substrate 20 by a distance sufficient to permit entry beneath those edge margins of at least leads 28 which extend to central terminals 32. Moreover, as shown for lead 34*a* FIG. 8, this upward spacing of marginal edges 46 is sufficient also to accommodate the ingress and egress beneath the associated one of domes 38 of a still-additional conductor that has no physical or electrical connection with that particular one of domes 38. As is obvious, this increases the flexibility of the pattern layout of the different leads that need to be deposited on substrate 20.

Dome feet 42 are disposed so as individually to lie on respective mating ones of segments 36*a* and 36*b*. It will be observed in FIG. 16 that different ones of segment-pairs 36*a*–36*b* are varied in relative orientation so as to have different respective geometric relationships on substrate 20. Since each of segments 36*a* and 36*b* is limited in area to approximately that on the substrate underlying the corresponding one of feet 42, the availability of different geometric orientations as between different switch sites 30 permits the better accommodation of different numbers of conductors between various different ones of the different switch sites 30. That is, the mutually-nearest terminal segments of adjacent switch sites may be oriented so as to be closest to one another when there is need for but very little conductive-lead space between those switch sites. On the other hand, those same outer terminal segments may be differently oriented so as to leave considerably more room between the respective switch sites when a number of conductors must pass therebetween.

Whenever a lead 28 or 34*a* extends beneath the marginal edge 46 of one of domes 38, that conductor portion may be insulatingly covered in a known manner so as to guard against inadvertent short circuiting between the lead and the dome. Preferably, however, the surface of substrate 20 that supports domes 38 is depressed, as at 48, in each area through which a conductive path extends immediately beneath a marginal edge 46 of a dome 38. This may be conveniently accomplished by the application of pressure through use of a die 49 having a generally-spherical face. Preferably, depression 48 is formed after the conductive leads have been plated or otherwise disposed on substrate 20. Consequently, the part of the conductive paths themselves which underlie a marginal edge 46 also are depressed into substrate 20.

Overlying substrate 20 and domes 38, and securing the domes to the substrate, is a thin layer 54 of flexible insulating material that is coated only on its underside with a film 56 of an adhesive material. Included in layer 54 are a plurality of apertures 58. Apertures 58 are distributed in an array which corresponds to the array of the different switch sites 30 on substrate 20. Thus, each of apertures 58 is aligned to be in registry with the respective different ones of domes 38. However, each of apertures 58 has a diameter which is smaller than the width of the associated dome. In use, layer 54 is adhesively affixed both to the individually different domes and to the upper surface of substrate 20 itself. This serves to maintain physical and electrical contact between feet 42 and the different outer terminals 36 or 36′. On the other hand, apertures 58 permit direct contact of the associated pushbutton with the region of each dome 38 surrounding its apex 40. This serves to retain a high degree of tactile feedback which would be lost if layer 54 were permitted to extend continuously across the apices of the different ones of the domes.

For assembly of domes 38 upon substrate 20, one known technique which may be employed is to use a small vacuum nozzle for the purpose of picking up a dome from a supply and placing that dome at its desired one of sites 30. Unfortunately, the domes have a characteristic such that, when combined in a supply bin or the like, they tend to stick together as by capillary attraction. Consequently, it is possible for the operator undesirably to place more than one dome at a given site. Also, of course, it takes considerable time to pick up the different domes individually.

Figure 14:
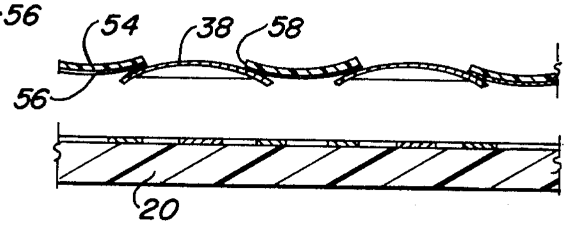
FIG. 14 is a fragmentary cross-sectional view illustrating one step in the manufacture of the assembly of FIGS. 1 and 2.
Figure 12:
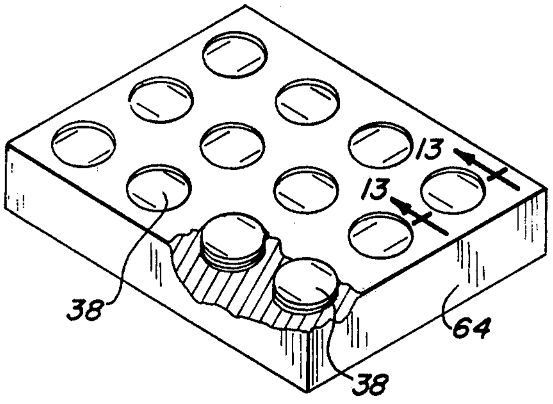
FIG. 12 is a perspective view of a supply magazine utilized in connection with the manufacture of the assembly of FIGS. and 2.
Figure 15:
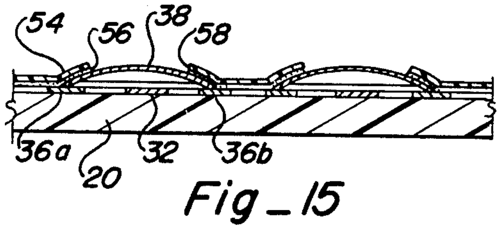
FIG. 15 is a fragmentary cross-sectional view similar to FIG. 14 but showing the parts in assembled position.
Figure 13:
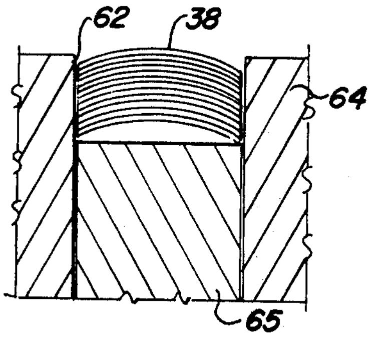
FIG. 13 is a fragmentary cross-sectional view taken along the line 13-13 13 in FIG. 12.

Layers 54 and 56 advantageously may be used for the assembly of the domes upon the substrate. To that end, a plurality of domes are stacked in an array of wells 62 disposed in a plate or magazine 64. Wells 62 are arranged in a pattern corresponding to the ultimately desired pattern of sites 30. Layer 54 is then positioned on top of magazine 64 and is pressed so that its adhesive coating 56 affixes to the uppermost one of domes 38 in each of the stacks. The operator then uses the end of one or more of his fingers to downwardly depress all of the uppermost ones of domes 38. This serves to free the uppermost ones of domes 38 in each stack. Then, layer 54, with the uppermost ones of domes 38 thereto adhesively affixed, is removed to a position overlying substrate 20 as shown in FIG. 14. After visually checking to make sure that each of domes 38 is in registry with the corresponding site 30 on substrate 20, layer 54 is pressed against the substrate while that registry is maintained. As a result, domes 38 and layer 54 are affixed in position as shown in FIG. 15. As indicated in FIG. 13, each well 62 preferably is bottomed by a plunger 65 urged upwardly by a spring or the like to serve as a magazine for delivering a constant supply of domes 38.

Figure 7:
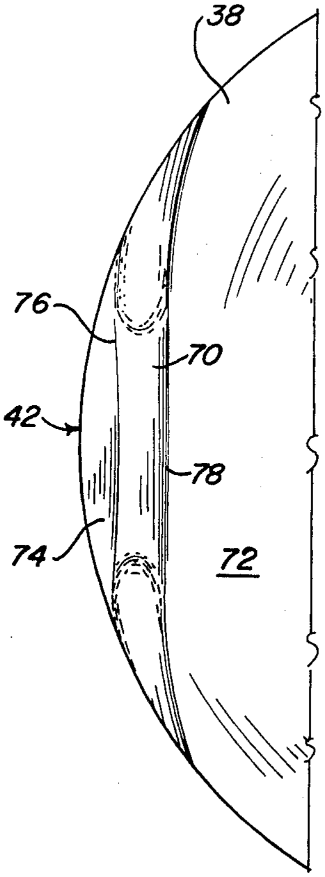
FIG. 7 is an enlarged fragmentary plan view of a portion of the component of FIG. 4 in preferably finished form.

The formation of feet 42 is particularly significant if long lifetimes are to be acquired. For present purposes, it is considered that a dome 38 exhibits a reasonably long lifetime if it will sustain many millions of flexures without failure. To that end, each foot 42 is formed to include a first panel 70 that slants downwardly from the spherical adjacent surface 72 of each dome 38. A second panel 74 slants onwardly downward beyond the first panel 70. Junction 76, between panels 70 and 74 is smeared out at its opposite end portions so as to merge smoothly into the peripheral margin of dome 38 as shown in FIG. 7. Similarly, the opposite end portions of junction 78, between panel 70 and surface 72, are smeared out so as also to merge smoothly into the peripheral margin of dome 38. The smearing out of the end portions of both junctions 76 and 78 is such as to eliminate the exterior or upper creases that had defined those end portions. In the alternative, there may be only one such panel. However, its junction with the spherical surface must have its upper crease smeared out as described in order to assure good lifetimes.

Figure 3:
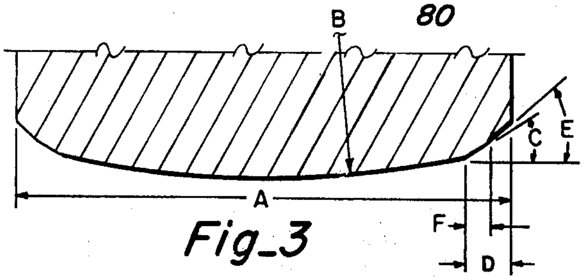
FIG. 3 is a cross-sectional view of a tool useful in producing a component of the assembly of FIGS. 1 and 2.
Figure 4:
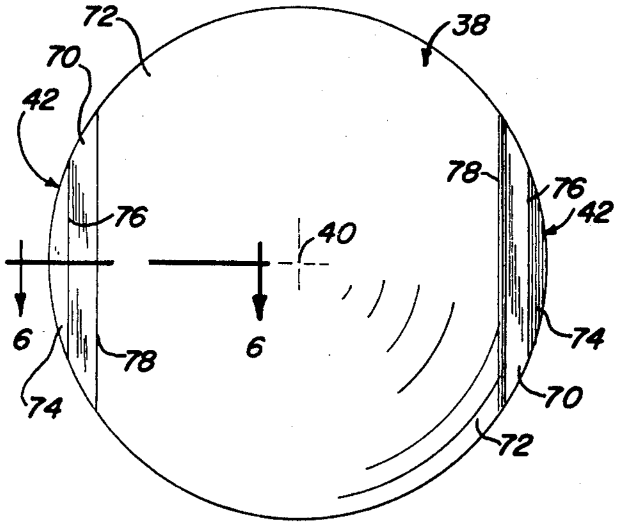
FIG. 4 is an enlarged plan view of a component of the assembly of FIGS. 1 and 2 and in what preferably is of unfinished form.

FIG. 3 depicts a die shaped for the purpose of meeting the foregoing requirements in connection with the formation of feet 42 in the punching of domes 38 from sheet 43. For the fabrication of a dome 38 that has a marginal-edge width A of 0.350 inch, the face of a die 80 initially is ground to a 0.750 inch spherical radius B. The punch is then set off center-line at an angle C of 30°. At each of circumferential index points of 0° and 180°, a flat is then ground to have a depth of cut of 0.0075 inch. The generated "foot" has a projected width D of 0.030 inch across its thickest section at a blend out with the external margin of the dome. Next, the punch is set at a position in which it is off its center-line by an angle E of 36°. Once more with indexing at 0° and 180°, two more cuts are ground in the symmetrically opposite positions. In this case, the depth of cut is approximately 0.002 inch. This develops a stepped foot in which the second cut blends to the external margin diameter so as to leave the previously-formed first cut to have a projected width F of about 0.018 inch. Finally, at least the outer or marginal end portions of each of junctions 76 and 78 are honed with a stone until a smooth-flowing contour and merger is established as previously described. Basically, the contact force of the dome may be varied by adjustment of the depth of cut or cuts. The actual cut depth selected must also be determined in consideration of the metal stock used and the overall dome diameter.

A number of advantageous features have been described. Some, such as the particulars in respect of the formation of feet 42, may find advantageous utility as an improvement upon a number of different prior keyboard assemblies. That would include assemblies in which conductors are disposed on both sides of a substrate. Similarly, the use of layers 54 and 56 is not necessarily restricted to any particular kind of dome, but may be employed advantageously with respect to a number of specific different dome shapes. However, the totality of that which is each herein disclosed leads to a combination of features believed to result in that which, with reference to the present state of the art, results in longer lifetimes and greater initial economy. Moreover, it is to be especially noted that the keyboard assembly improvements herein described are not restricted to application in calculators. Instead, it is to be observed that they are capable of usage in a wide variety of digital signalling implementations. Examples are telephone dialing, computor addressing and process controlling.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In the assembly of a plurality of dome-shaped resilient contact elements in a predetermined pattern to overlie a similar pattern of spaced-conductor regions carried upon an insulating substrate, so that said elements may be centrally depressed to bridge spaced conductor portions, the steps of:

stocking a plurality of said elements in each of a plurality of wells disposed in a plate in a pattern corresponding to said predetermined pattern;

positioning a layer of flexible insulating material, adhesively coated on its undersurface, over the stacks of said elements in said plate with said layer including a plurality of apertures arranged in said predetermined pattern and individually of a diameter smaller than the width of said elements;

pressing said layer against the uppermost one of said elements in each of said stacks with said apertures in registry with said uppermost ones of said elements;

downwardly depressing all of said uppermost ones of said elements;

removing said layer, with said uppermost ones of said elements thereto adhesively affixed, to a position overlying said substrate with said uppermost ones of said elements in registry with said corresponding pattern of regions;

and pressing said layer against said substrate, while maintaining said registry, to adhesively secure said layer in a position mounted upon said substrate.

2. In the assembly of a plurality of at least generally dome-shaped resilient contact elements in a predetermined pattern to overlie a related pattern of spaced-conductor regions carried upon an insulating substrate, so that said elements may be centrally depressed to bridge spaced conductor portions, the steps of:

stocking a plurality of said elements in each of a plurality of stacks and in a layout corresponding to said predetermined pattern;

positioning a layer of flexible insulating material, adhesively coated on its undersurface, over said stacks of said elements with said layer including a plurality of apertures arranged in said predetermined pattern and individually of a diameter smaller than the width of said elements;

pressing said layer against the uppermost one of said elements in each of said stacks with said apertures in registry with said uppermost ones of said elements;

removing said layer, with the uppermost ones of said elements thereto adhesively affixed, to a position overlying said regions with the affixed ones of said elements in registry with said related pattern of said regions;

and pressing said layer toward said regions, while maintaining said registry, to adhesively secure said layer in a position mounted upon said substrate --.

3. In the assembly of individually-separate dome-shaped resilient contact elements in a predetermined pattern to overlie a similar pattern of spaced-conductor regions carried upon an insulating substrate, so that said elements may be centrally depressed to bridge spaced conductor portions, the steps of:

stocking a plurality of said elements in each of a plurality of wells disposed in a plate in a pattern corresponding to said predetermined pattern;

positioning a layer of flexible insulating material, adhesively coated only on its undersurface, over the stacks of said elements in said plate;

pressing said layer against the uppermost one of said elements in each of said stacks;

downwardly depressing all of said uppermost ones of said elements;

removing said layer, with said uppermost ones of said elements thereto adhesively affixed, to a position overlying said substrate with said uppermost ones of said elements in registry with said corresponding pattern of regions;

and pressing said layer against said substrate, while maintaining said registry, to adhesively secure said layer in a position mounted upon said substrate.

4. An assembly technique as defined in Claim 1 in which said layer includes a plurality of apertures arranged in said predetermined pattern and individually of a diameter smaller than the width of said elements, said layer being pressed against said uppermost ones of said elements in each of said stacks with said apertures in registry with said uppermost ones of said elements.

5. In the assembly of a plurality of individually-separate at least generally dome-shaped resilient contact elements in a predetermined pattern to overlie a related pattern of spaced-conductor regions carried upon an insulating substrate, so that said elements may be centrally depressed to bridge spaced conductor patterns, the steps of:

stocking a plurality of said elements in each of a plurality of stacks and in a layout corresponding to said predetermined pattern;

positioning a layer of flexible insulating material, adhesively coated only on its undersurface, over said stacks of said elements;

pressing said layer against the uppermost one of said elements in each of said stacks;

removing said layer, with the uppermost ones of said elements thereto adhesively affixed, to a position overlying said regions with the affixed ones of said elements in registry with said related pattern of said regions;

and pressing said layer toward said regions, while maintaining said registry, to adhesively secure said layer in a position mounted upon said substrate.

6. An assembly technique as defined in claim 5 in which said elements are stacked in a plurality of wells disposed in a plate in a pattern corresponding to said predetermined pattern.

7. An assembly technique as defined in Claim 5, in which, with said layer being positioned over said stacks, the uppermost ones of said elements in said stacks are downwardly depressed.

8. An assembly as defined in Claim 5 in which said layer is pressed toward said regions so as also to bond said layer directly to said substrate.

* * * * *